Oct. 10, 1944.   J. JANDASEK   2,360,234
TURBO TRANSMISSION
Filed Jan. 27, 1941   2 Sheets-Sheet 1

INVENTOR.
JOSEPH JANDASEK
BY
ATTORNEY

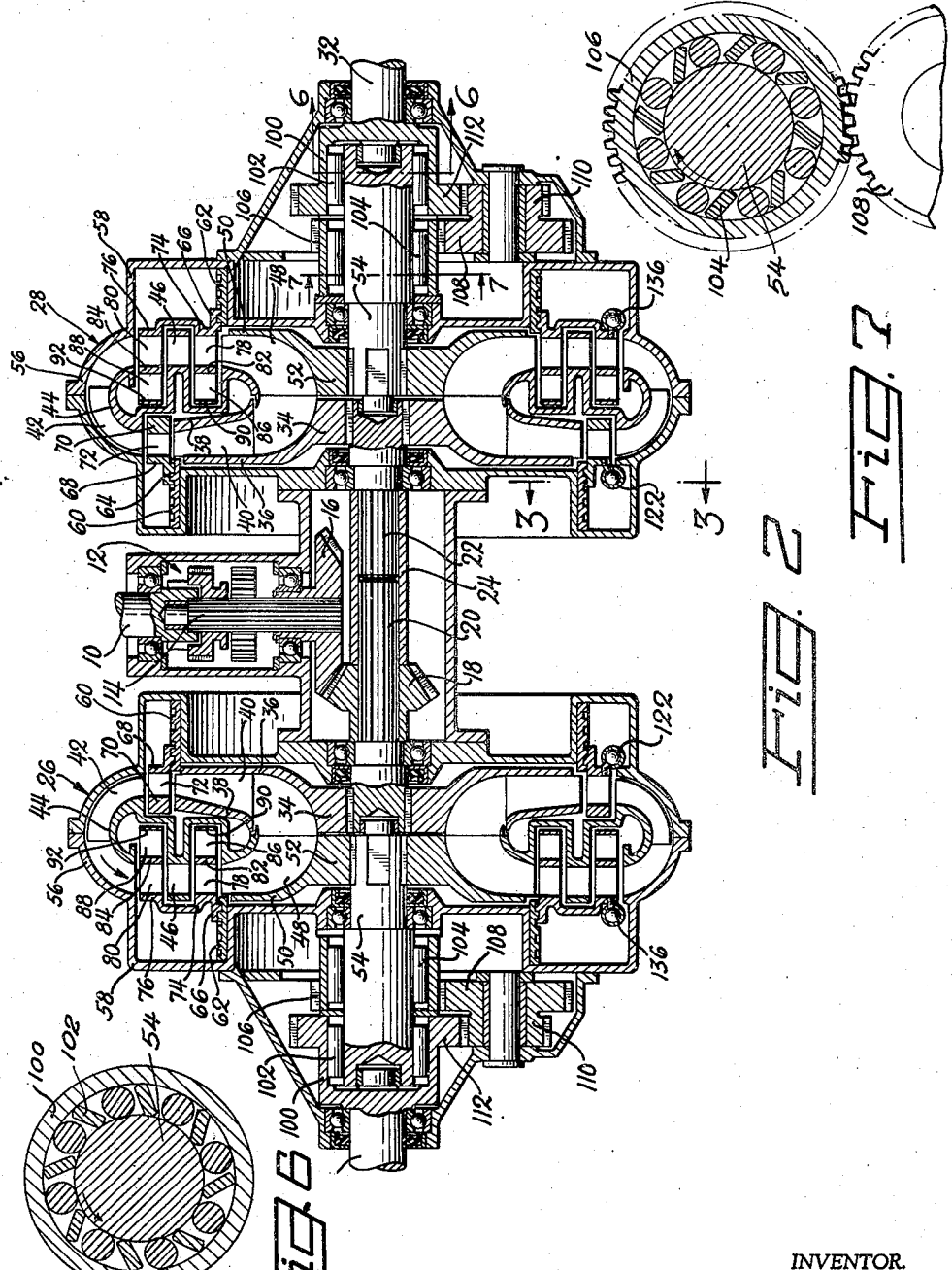

Patented Oct. 10, 1944

2,360,234

UNITED STATES PATENT OFFICE 2,360,234

TURBOTRANSMISSION

Joseph Jandasek, Detroit, Mich., assignor to Bendix Aviation Corporation, South Bend, Ind., a corporation of Delaware Application January 27, 1941, Serial No. 376,152

2 Claims. (Cl. 180—9.2)

This invention relates to turbo transmissions and more particularly to a fluid operated turbo transmission having reversible means whereby the device may be utilized to transmit power in either direction.

This invention contemplates a turbo transmission wherein a plurality of energy absorbing rotatable turbine members are employed and preferably a plurality of reactionary members which may be selectively introduced into the power transmitting fluid circuit to vary the power transmitting characteristics of the device.

Considerable difficulty has been experienced in the steering of vehicles of the so-called "Track Layer" type wherein the vehicle is propelled by movement of an endless belt or track member preferably having cleats, such for example as tanks used for armament purposes. Such vehicles are normally steered by applying a braking force to retard or stop the movement of the track on one side of the tank or vehicle whereupon the power transmitted to the track on the other side of the vehicle exerts a turning force to effect steering of the vehicle.

An object of this invention is to provide a turbo drive whereby a steering force may be exerted on a tank by varying the amount of power transmitted to propel the tracks on opposite sides thereof.

A further object of the invention resides in the provision of means for controlling spaced turbo power transmitting devices wherein means are provided to throttle or decrease the power transmitted by one of the turbo units while at the same time increasing the power transmitted by the other turbo unit to exert a force to steer a vehicle.

Still another object of the invention is to provide a pair of spaced turbo power transmitting devices having novel and improved control means whereby one of the turbo devices may be employed to transmit power in forward direction while the other of the turbo devices transmits power in reverse direction to exert a steering force on a vehicle such for example as a tank of the "Track Layer" type to exert a steering force thereon.

Another object is to provide a plurality of spaced energy absorbing turbine elements having movable reaction members associated therewith in such a manner that the direction of power transmission may be reversed by movement of the reaction members to one of a plurality of settable positions.

A further object resides in the provision of a novel control means for a turbo transmission device wherein the direction of the flow of power through the device may be reversed by selectively positioning a guide wheel member in one of a plurality of settable positions, and wherein means operated by a progressive movement of the guide wheel toward a different settable position is operative to progressively vary the amount of power transmitted by the device to provide a gradual change of direction of power transmission.

Another object is to provide a turbo transmission having speed varying means interposed between a driving shaft and a fluid energizing impeller whereby power may be transmitted to the turbo device at a plurality of varying speeds, and wherein speed varying means associated with a shaft driven by an energy absorbing turbine member may be interposed between said member and a final driven member to vary the turning moment transmitted to the final driven shaft.

Yet a still further object of the invention resides in the provision of angularly movable force transmitting means for controlling the position of a guide wheel member with reference to a power transmitting fluid circuit.

Another object is to provide a plurality of laterally spaced manually operable means which may be selectively actuated to control spaced power transmitting fluid devices to vary the quantity and direction of power transmitted by said devices to exert a force to steer a track laying vehicle.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 2 is a longitudinal sectional view of a transmission device embodying the present invention.

Fig. 6 is a sectional view taken substantially on the line 6—6 of Fig. 2, looking in the direction of the arrows.

Fig. 7 is a sectional view taken substantially on the line 7—7 of Fig. 2, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figures 1, 4:
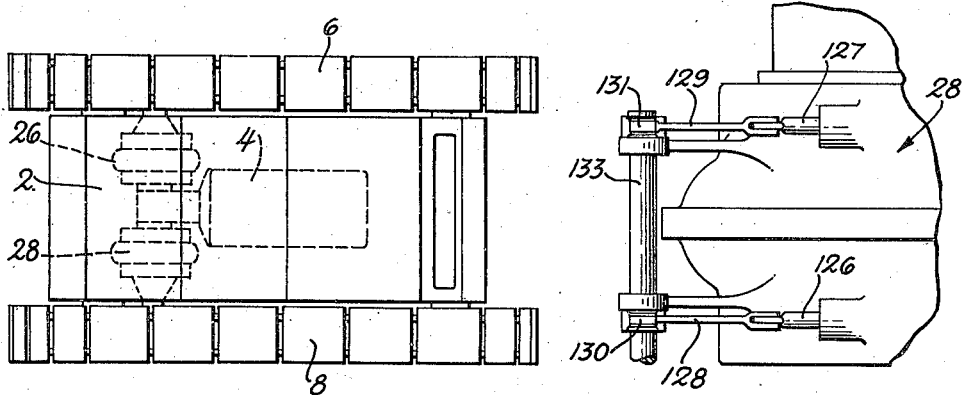
Fig. 1 is a plan view of a track layer vehicle embodying the present invention.
Fig. 4 is a bottom view of the mechanism illustrated in Fig. 3.

As illustrated in Fig. 1, the invention is illustrated as embodied in a vehicle of the track layer type such for example as an armored tank 2 used for armament purposes. The tank 2 has an engine or prime mover 4 and a pair of spaced longitudinally extending tracks 6 and 8 positioned on the left and right sides of the tank respectively. The tank may be propelled forwardly or backwardly by moving the tracks 6 or 8 longitudinally of the tank and may be steered by driving the tracks 6 and 8 in opposite directions relative to each other or by applying more power to drive one of the tracks than is applied to drive the other.

Referring now to Fig. 2, it will be observed that power may be transmitted from the engine or prime mover 4 by way of a driving shaft 10 operably connected through a two-speed gear box 12 to drive a shaft 14 having a pinion 16 fixed thereto. The pinion 16 meshes with another pinion gear 18 operably connected to a pair of spaced shafts 20 and 22 by means of a splined sleeve 24 concentrically mounted relative to the shafts 20 and 22. The pinion 16 may, as illustrated, be larger than the pinion 18 to drive the shafts 20 and 22 faster than the shaft 14.

Each of the shafts 20 and 22 is operably connected to drive a turbo power transmitting device 26 and 28 respectively having final driven shafts 30 and 32 respectively. The final driven shafts 30 and 32 may be operably connected to drive any desired mechanism such for example as the tracks 6 and 8 respectively of the track layer vehicle such for example as a tank illustrated in Fig. 1.

The power transmitting devices 26 and 28 are symmetrical and are preferably oppositely disposed to drive the oppositely directed final driven shafts 30 and 32 in the same directions. Since the power transmitting devices 26 and 28 are symmetrical they will be described simultaneously.

An impeller hub 34 is operably connected to the shaft 22 and is provided with spaced web and shroud members 36 and 38 respectively having suitable blades to define therebetween a fluid circuit 40 wherein fluid may be energized under the influence of centrifugal force exerted by rotation of the shaft 22 and directed outwardly to a first stage turbine channel 42, having suitable vanes, associated with a turbine shroud member 44. The turbine shroud 44 is contoured as illustrated and provides a second stage turbine channel 46 and a third stage turbine channel 48 which may be operably connected to a turbine web 50 carried by a turbine hub 52 fixed to a driven shaft 54.

A stationary housing 56 is preferably concentrically mounted with reference to the impeller and turbine members and is provided with an axially extending portion 58 preferably adjacent the second stage turbine channel 46. The housing 56 is provided with a plurality of spaced preferably axially extending helixes 60 and 62 of step pitch which support preferably internally threaded rings 64 and 66. The ring 64 is provided with a guide wheel web 68 and a guide wheel shroud 70 having a guide wheel channel 72 interposed therebetween.

The ring 66 is provided with a guide wheel web having spaced radially extending portions 74 and 76 which are provided with suitable vanes to form wheel passages 78 and 80 respectively bounded by walls 82 and 84 respectively. The walls 82 and 84 are provided with suitable vanes to form guide wheel channels 86 and 88 bounded by shroud members 90 and 92.

Means associated with the axially movable guide wheel members are provided to transmit power from the impeller to the turbine members in forward and reverse directions.

One desirable form of such reversible means comprises vanes positioned in the guide wheel channels 72, 78 and 80 respectively to deflect the fluid issuing from the impeller in such a manner as to cause it to impinge upon the vanes of the turbine members in such a manner as to drive the driven shaft 54 in the opposite direction to the direction of rotation of the driving shaft 22.

To transmit power from the driving to the driven shaft in forward speed the guide wheel channel 72 is withdrawn from the power transmitting fluid circuit, and the helically threaded ring 66 is moved on the helical thread 62 of the stationary member 58 to withdraw the guide wheel channels 78 and 80 from the fluid circuit and move the channels 86 and 88 into alignment with the second and third stage turbines 46 and 48 respectively. The guide wheel channels 86 and 88 are provided with vanes suitably contoured to deflect the liquid circulating in the power transmitting fluid circuit in the direction to exert force on the turbine members to rotate them in the same direction as the impeller rotates. Power will then be transmitted to the driven shaft 54 in the forward direction.

With the guide wheel members in the position illustrated the device operates to transmit power in the reverse direction wherein the driven shaft 54 rotates in the opposite direction to the driving shaft 22. To transform the device to operate in the forward direction the guide wheel member 64 is moved axially on the helical threads 60 whereupon the shroud member 70, which as illustrated is of considerable width axially, throttles or partially obstructs the power transmitting fluid circuit thereby progressively interrupting the fluid flow and decreasing the quantity of power transmitted. As the movement of the guide wheel member progresses the shroud 70 moves across the power transmitting fluid circuit and is progressively withdrawn therefrom. When the shroud 70 is fully withdrawn from the circuit the space between the impeller channel 40 and the first stage turbine channel 42 is unobstructed and acts as a free vortex whereupon fluid from the impeller may pass directly into the turbine channel 42. Remarkably efficient transmission of power is thus effected.

The turbine or driven shaft 54 is concentrically aligned with reference to an axially extending drum 100, fixed to and carried by the final driven shaft 32. One-way driving means 102 may be interposed between the driven shaft 54 and the drum 100 carried by the final driven shaft 32 to drive the final driven shaft 32 in forward direction at substantially the same speed of rotation as the turbine or driven shaft 54.

When the guide wheel channels 72, 78 and 80 are positioned in the power transmitting fluid circuit, to drive the turbine or driven shaft 54 in the reverse direction, the power is transmitted from the driven shaft 54 through one-way driving means 104 to a gear 106. The gear 106 meshes with a pinion 108 having a driving pinion 110 which meshes with a pinion 112 carried by the drum 100. The gear ratio is preferably such that when the turbine or driven shaft 54 is rotated in reverse direction the flow of power through the pinion gears 108, 110 and 112 is such that power is transmitted at higher torque multiplication and at lower speed where an increase of torque in reverse direction is required or would be desirable.

Figures 3, 5:
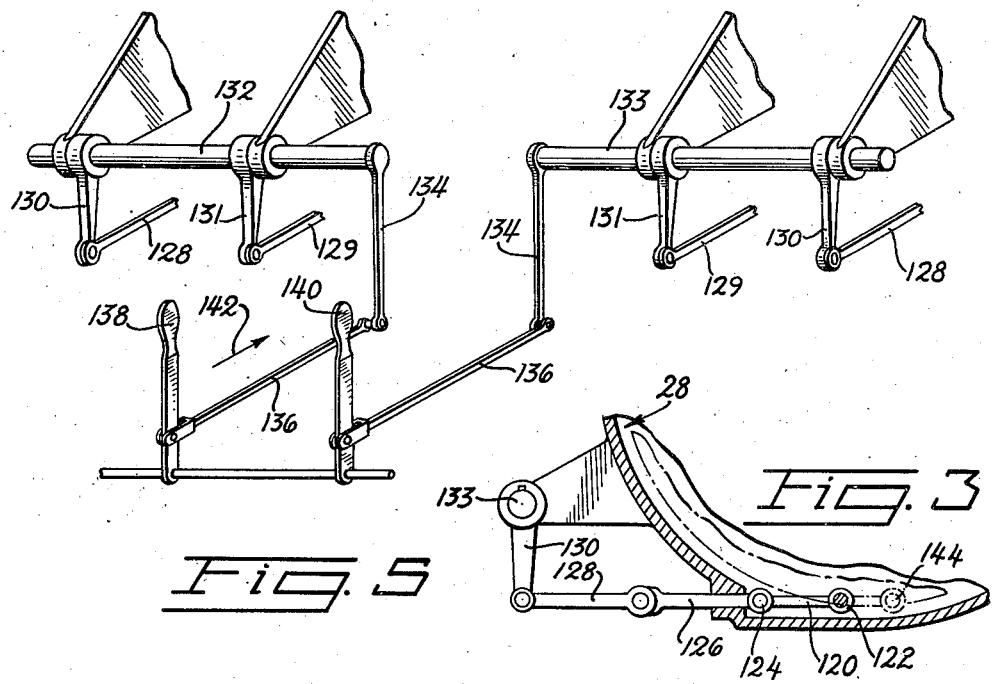
Fig. 3 is a sectional view taken substantially on the line 3—3 of Fig. 2, looking in the direction of the arrows.
Fig. 5 is a diagrammatic view illustrating a mechanism for controlling the power transmitting device illustrated in Fig. 1.

Manually operable means may be provided to control the position of the guide wheel circuits 72, 78 and 80 with reference to the power transmitting fluid circuit to transmit power in reverse or forward direction. One desirable form of such control means is illustrated in Figs. 2 to 4 wherein actuating members 120 which may be of any suitable form are operably connected with the guide wheel rings 64 and 66 having angularly related helical threads 60 and 62 of steep pitch by means of suitable ball and socket connections 122. The members 120 are operably connected to rods 126 and 127 respectively by means of ball connections 124, and the rods 126 and 127 are operably connected through links 128 and 129 with arms 130 and 131 fixed to a shaft 132.

Each of the turbo units 26 and 28 is provided with a control shaft 132 and 133 respectively. The shafts 132 and 133 controlling the units 26 and 28 respectively may be operably connected through links 134 and rods 136 with manually operable levers 138 and 140 respectively. The manually operable levers 138 and 140 are illustrated in Fig. 5 in a neutral position. The turbo units 26 and 28 may be selectively and independently controlled by the levers 138 and 140 respectively, and one of the turbo units can be operating to transmit power in one direction while the other unit is transmitting power in the opposite direction. Both units may transmit power in forward or in reverse direction.

In the operation of this device when it is desired to drive the vehicle in forward direction the levers 138 and 140 are actuated forwardly in the direction of the arrow 142, as illustrated in Fig. 5, whereupon the interconnected links and levers illustrated in Figs. 3 to 5 move the ball joints 122 from the full line position to the dotted line position 144 thereby moving the guide wheel channels 72, 78 and 80 out of the fluid circuit and introducing the guide wheel channels 86 and 88 into the power transmitting fluid circuit to transmit power in forward direction.

When it is desired to steer the vehicle, such for example as to the left, the left handle 138 is moved backwardly against the direction of the arrow 142. The interconnected links and levers then move the shroud 70 axially into the power transmitting fluid circuit of the turbo unit 26 to progressively throttle the circuit and decrease the power transmitted to the final driven shaft 30 of the left hand turbo unit 26. Where the device is embodied in a track laying vehicle such for example as the tank illustrated in Fig. 1, the power applied to propel the left track 6 would be decreased by movement of the shroud 70 into the power transmitting fluid circuit of the turbo unit 26.

As the power transmitted by the turbo unit 26 is decreased, the power exerted to drive the impeller of the unit 28 is increased because of the interconnection of the pinion 18 and the shafts 20 and 22 therewith. Greater power is therefore exerted by the turbo unit 28 to propel the right hand track 8 of the track laying vehicle. The increase of the propelling force exerted on the right hand track 8, and the decrease of the propelling force exerted on the left hand track 6 exert a steering force on the tank to steer it to the left.

If a more rapid turn to the left is desired the handle 138 is moved further backwardly against the direction of the arrow 142 whereupon the guide wheel channels 78 and 80 will be introduced into the power transmitting fluid circuit to operate the turbo unit 26 in reverse whereupon the final driven shaft 30 rotates in the direction opposite to the direction of rotation of the driving shaft 20 of the unit 26. The handle 140 controlling the turbo unit 28 is maintained in the forward position whereupon the guide wheel circuit 72 will be withdrawn from the power transmitting fluid circuit and the guide wheel circuits 86 and 88 will be introduced into the power transmitting fluid circuit to drive the final driven shaft 32 of the unit 28 in the same direction as the driving shaft 22.

A force is thus exerted by the turbo unit 28 to propel the vehicle or tank 2 forwardly with reference to the right tracks 8 on its right side, and a force is exerted by the turbo unit 26 to propel the tank backwardly with reference to the tracks 6 on its left side. A rapid turning of the tank can thus be effected. To make a right turn the procedure outlined above is reversed.

Attention is called to the fact that if a gradual turn is desired, the power exerted to drive the track of the tank on the inside of the curve can be decreased and the power exerted to drive the track of the tank on the outside of the curve can be increased. Virtually the entire power of the prime mover is thus available to propel the tank even when a curve is being executed. A marked improvement is thus effected over the conventional designs wherein a brake is applied to restrain the track on the inside of the curve while the same driving force is exerted to propel the track on the outside of the curve. Where a rapid turn is desired the entire effective power of the prime mover 4 can be exerted to propel the tracks 6 and 8 in opposite directions. A marked improvement is thus effected over designs wherein power can only be applied to one side of a tank to effect a turn.

I claim:

1. In a track laying vehicle having spaced longitudinally extending tracks, an engine, spaced impeller shafts driven by the engine, spaced fluid transmissions comprising impellers and turbines cooperating to form spaced power transmitting fluid circuits, spaced turbine shafts operable connected to the turbines, final driven shafts, one-way driving means between each turbine shaft and its associated final driven shaft whereby power may be transmitted to each final driven shaft at a fixed gear ratio when its turbine shaft is rotating in the forward direction, one-way driving and gear means interconnecting each turbine shaft and its associated final driven shaft whereby the final driven shaft may be driven in the reverse direction to transmit increase torque when its associated turbine shaft is rotating in reverse, spaced stationary members, spaced reaction members associated with the stationary members, each reaction member including a plurality of spaced channel portions to transmit power in the forward direction or in reverse, throttling means to vary the effective cross sectional area of each power transmitting fluid circuit, to vary the power transmitted by each of said fluid transmissions, and separate manually operable means controlling the position of the throttling means of each fluid transmission whereby the power transmitted to one of said turbine shafts may be progressively varied, said manually operable means also controlling the reaction members of each fluid transmission to transmit power in reverse with increased torque multiplication to one of the tracks of the vehicle and to transmit power in the forward direction to the other tracks of the vehicle to exert a force to steer the vehicle.

2. In a track laying vehicle having spaced longitudinally extending tracks, an engine, a multi-speed gear box, connecting means between the engine and the gears of the multi-speed gear box, spaced impeller shafts driven by the gears of the multi-speed gear box, spaced fluid transmissions comprising impellers and turbines cooperating to form spaced power transmitting fluid circuits, spaced turbine shafts operably connected to the turbines, final driven shafts, connecting means between the final driven shafts and the spaced tracks of the vehicle, one-way driving means between each turbine shaft and its associated final driven shaft whereby power may be transmitted to each final driven shaft at a substantially 1:1 gear ratio when its turbine shaft is rotating in the forward direction, one-way driving and gear means interconnecting each turbine shaft and its associated final driven shaft whereby the final driven shaft may be driven in the reverse direction to transmit increased torque when its associated turbine shaft is rotating in reverse, spaced stationary members, spaced reaction members associated with the stationary members, each reaction member including a plurality of spaced channel portions having angularly related vanes adapted to be selectively aligned with its associated power transmitting fluid circuit to transmit power in the forward direction or in reverse, throttling means associated with each stationary member and movable to vary the effective cross sectional area of each power transmitting fluid circuit to progressively decrease the power transmitted by each of said fluid transmissions, and separate manually operable means controlling the position of the throttling means of each fluid transmission whereby the power transmitted to one of said turbine shafts may be progressively varied, said manually operable means also controlling the reaction members of each fluid transmission to transmit power in reverse with increased torque multiplication to one of the tracks of the vehicle and to transmit power in the forward direction to the other tracks of the vehicle to exert a force to steer the vehicle.

JOSEPH JANDASEK.